United States Patent
Kwon et al.

(10) Patent No.: US 8,894,957 B2
(45) Date of Patent: Nov. 25, 2014

(54) METHOD OF PRODUCING NANOPHOSPHOR PARTICLES

(75) Inventors: Soon-jae Kwon, Yongin-si (KR); Hyun-sik Kim, Yongin-si (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 286 days.

(21) Appl. No.: 12/292,894

(22) Filed: Nov. 28, 2008

(65) Prior Publication Data

US 2009/0142245 A1 Jun. 4, 2009

(30) Foreign Application Priority Data

Nov. 29, 2007 (KR) .......... 10-2007-0122735
Oct. 27, 2008 (KR) .......... 10-2008-0105476

(51) Int. Cl.
*C01F 17/00* (2006.01)
*C09K 11/77* (2006.01)

(52) U.S. Cl.
CPC ......... *C09K 11/7797* (2013.01); *C09K 11/7712* (2013.01); *Y10S 977/775* (2013.01)
USPC .......................................... 423/263; 977/775

(58) Field of Classification Search
None
See application file for complete search history.

(56) References Cited

U.S. PATENT DOCUMENTS

| | | | | |
|---|---|---|---|---|
| 3,555,696 A | * | 1/1971 | Pistor et al. | 34/342 |
| 4,067,815 A | * | 1/1978 | Scholl et al. | 252/609 |
| 5,166,456 A | * | 11/1992 | Yoshino | 252/301.4 S |
| 6,042,747 A | * | 3/2000 | Rao | 252/301.4 R |
| 6,585,911 B2 | * | 7/2003 | Wolfe | 252/301.4 R |
| 7,056,451 B2 | * | 6/2006 | Manivannan et al. | 252/301.4 R |
| 2010/0155753 A1 | * | 6/2010 | Imanari et al. | 257/98 |

FOREIGN PATENT DOCUMENTS

| | | |
|---|---|---|
| JP | 2004224806 | 8/2004 |
| JP | 2004263088 | 9/2004 |
| JP | 2005298679 | 10/2005 |

OTHER PUBLICATIONS

Wei et al, Fluorescence intensity and color purity improvement in nanosized YBO3:Eu, 2002, applied physics letters, vol. 80, No. 8 pp. 1447-1449.*

Japanese Office Action dated Apr. 9, 2013 issued by JPO in connection with Japanese Patent Application No. 2008-305445 and also which claims Korean Patent Application 10-2007-0122735 and 10-2008-0105476 with Request for Entry of the accompanying Office Action.

* cited by examiner

*Primary Examiner* — Melvin C Mayes
*Assistant Examiner* — Stefanie Cohen
(74) *Attorney, Agent, or Firm* — Robert E. Bushnell, Esq.

(57) ABSTRACT

Provided is a method of producing spherical nanophosphor particles having a uniform size distribution. When nanophosphor obtained using the method is used in a flat panel display, the flat panel display has higher screen brightness and a higher resolution.

16 Claims, 5 Drawing Sheets

METHOD OF PRODUCING NANOPHOSPHOR PARTICLES

CROSS-REFERENCE TO RELATED PATENT APPLICATIONS

This application makes reference to, incorporates the same herein, and claims all benefits accruing under 35 U.S.C. §119 from an application for METHOD OF PREPARING NANO PHOSPHORS earlier filed in the Korean Intellectual Property Office on 29 Nov. 2007 and there duly assigned Serial No. 10-2007-0122735 and from an application for A METHOD FOR PREPARING NANO PHOSPHORS AND NANO PHOSPHORS PREPARED USING SAME earlier filed in the Korean Intellectual Property Office on 27 Oct. 2008 and there duly assigned Serial No. 10-2008-0105476.

BACKGROUND

1. Field

This disclosure relates to a method of producing nanophosphor particles in which phosphor precursors are treated with an inorganic salt.

2. Description of the Related Art

Phosphors are a substance that emits light after exposure to energy. In general, phosphors are used in a light source such as a mercury fluorescent lamp or a non-mercury fluorescent lamp, or various other devices such as a field emission device or a plasma display panel. In the future, phosphors are expected to be used in a wider range of application as various multimedia devices are developed.

A nanophosphor is a nano-sized phosphor, and can reduce a light scattering effect compared to a conventional bulky phosphor.

Properties of a nanophosphor include small sizes, interparticle separation, and excellent emission efficiency. In general, however, small and highly distributed phosphors have low emission efficiency, and also, when the heat treating temperature or time is increased to obtain high emission efficiency, particles of phosphor can agglomerate together, resulting in the size of phosphor being greater than nano sizes. To overcome this, a spray-pyrolysis technique, a hydrothermal synthesis technique, a solvothermal synthesis technique, a sol-gel synthesis technique, or a laser crystallization technique can be used. These methods secure excellent properties, but are expensive and unsuitable for mass production.

SUMMARY

This disclosure provides a method of producing nanophosphor particles that have controlled shapes and do not agglomerate.

This disclosure also provides nanophosphor particles having a uniform particle size and excellent efficiency, produced using the method.

According to an aspect, there is provided a method of producing nanophosphor, including: dissolving a phosphor starting material and a precipitating agent in a solvent, thereby producing a phosphor precursor; treating the phosphor precursor with an inorganic salt; and heat-treating the phosphor precursor treated with the inorganic salt to produce nanophosphor particles.

According to another aspect, there is provided a method of producing a $YBO_3$-based nanophosphor, including: dissolving a phosphor starting material including an yttrium (Y) source compound, a boron (B) source compound and a precipitating agent in a solvent, thereby producing a phosphor precursor; treating the phosphor precursor with an inorganic salt; and heat-treating the phosphor precursor treated with the inorganic salt to produce $YBO_3$-based nanophosphor particles.

The method may further include removing the inorganic salt by washing.

The phosphor starting material may include: a compound represented by $ML_3$ where M includes at least one selected from the group consisting of Y, La, Ce, Eu, Gd, Tb, Er, Yb and any mixtures thereof; and L includes at least one selected from the group consisting of Cl, Br, $NO_3$, $OCH_3$, $OC_2H_5$, $OC_3H_7$, $OC_4H_9$ and any mixtures thereof; and at least one selected from the group consisting of $H_3BO_3$, boron hydride, an organic boron compound, $H_3PO_4$, $NH_4H_2PO_4$, $(NH_4)_2HPO_4$, $NaVO_3$ and $NH_4VO_3$ and any mixtures thereof.

The solvent may include at least one selected from the group consisting of water, aliphatic monool, aliphatic diol, aliphatic triol, and any mixtures thereof.

Phosphor precursor will be formed while heating, and the heating may be performed using a microwave.

The precipitating agent may be a basic compound. The basic compound may be urea, an aqueous ammonia solution, an aqueous hydrazine ($NH_2NH_2$) solution, or any mixtures thereof.

A surface-active agent may be additionally used during the synthesizing of the phosphor precursor. The surface-active agent may include at least one material selected from the group consisting of citric acid, acetic acid, sodium acetate, ammonium acetate, oleic acid, sodium oleate, ammonium oleate, ammonium succinate, polyacrylate, glycine, acyl glutamate, and any mixtures thereof.

In the treating the phosphor precursor with the inorganic salt, a space between neighboring phosphor precursor particles is filled with the inorganic salt. The inorganic salt may be used in the state of a saturated aqueous solution.

The inorganic salt may include at least one material selected from the group consisting of $NaBO_2$, $LiBO_2$, $KBO_2$, $MgSO_4$, $Li_2SO_4$, $Na_2SO_4$, $K_2SO_4$, $MgCl_2$, $CaCl_2$, $SrCl_2$, $BaCl_2$, $Li_2CO_3$, $Na_2CO_3$, $K_2CO_3$, $Rb_2CO_3$, LiCl, NaCl, KCl, RbCl, CsCl, and any mixtures thereof.

According to an aspect, there is provided a nanophosphor particle produced using the method. The nanophosphor particle may be a $YBO_3$-based nanophosphor particle.

According to another aspect, there is provided a $YBO_3$-based nanophosphor particle, wherein in a photoluminescence emission spectrum obtained using a monochromatic light having a wavelength of 254 nm as an excitation source, the intensity of an emission component at a wavelength of about 594 nm is equal to or smaller than the intensity of an emission component at a wavelength of about 613 nm.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1:
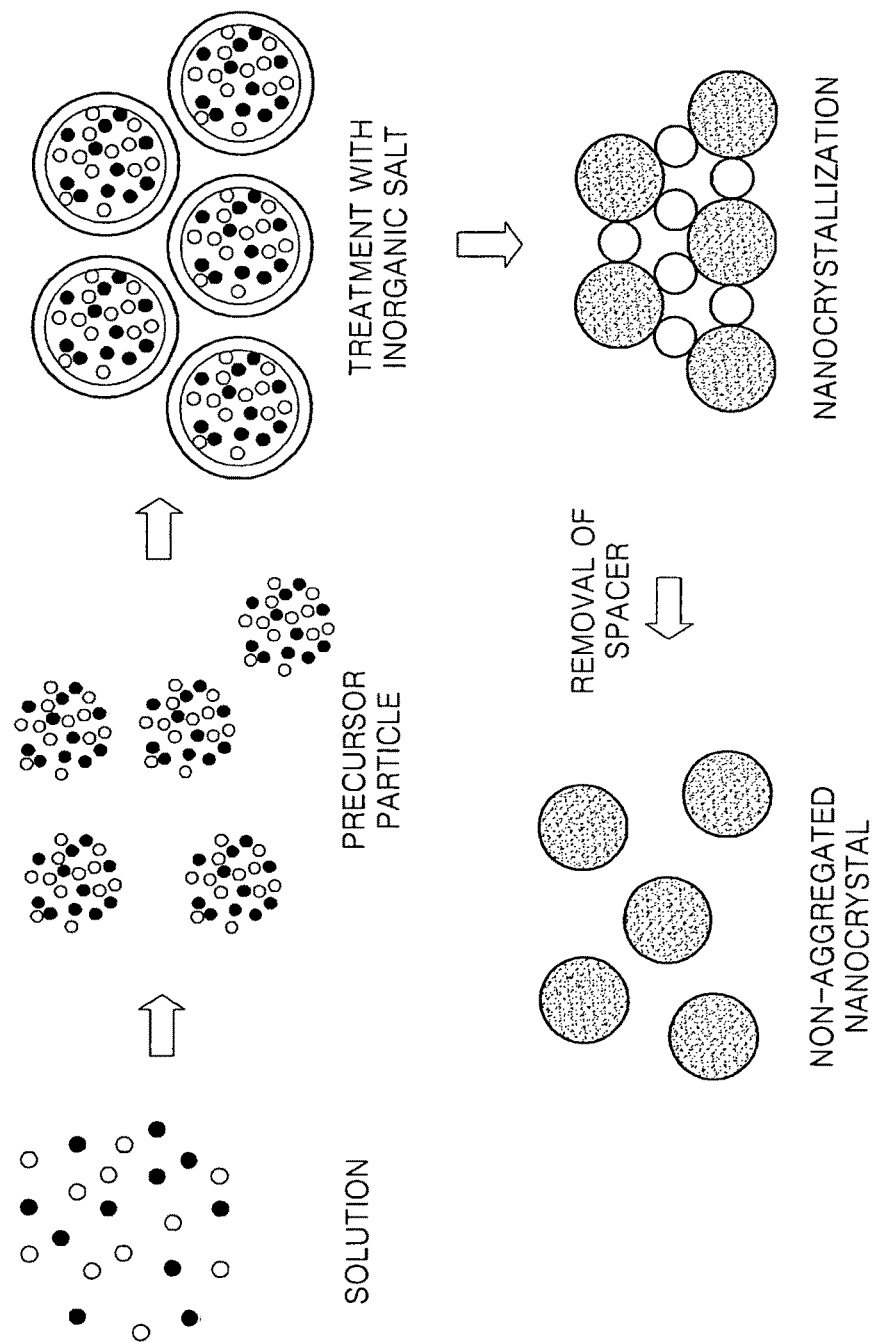
FIG. 1 is a schematic view illustrating a method of producing nanophosphor particles according to an exemplary embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

FIG. 1 is a schematic view illustrating a method of producing nanophosphor particles according to an exemplary embodiment.

As illustrated in FIG. 1, a phosphor starting material is dissolved in a solvent and a precipitating agent is added thereto to obtain a phosphor precursor. This process may be performed while stirring. Herein, the phosphor precursor may be in a non-crystalline state and may be in a gel or particle state.

The phosphor starting material may be any material that is capable of being converted to a phosphor. According to an exemplary embodiment, a rare earth element (Re)-based phosphor may be formed using a lanthanide (Ln) source compound and at least one of a yttrium (Y) source compound, a boron (B) source compound, a phosphorous (P) source compound, and a vanadium (V) source compound, wherein Ln denotes one of La, Ce, Pr, Nd, Sm, Eu, Gd, Tb, Er, and Yb. For example, a rare earth element (Re) borate-based phosphor may be formed using the Ln source compound, the yttrium (Y) source compound and the boron (B) source compound as starting materials.

Also, according to an exemplary embodiment, the amount of the boron (B) source compound, the phosphorous (P) source compound, or the vanadium (V) source compound used may be 1 to 3 times (based on a molar ratio), for example 1.2 to 2 times or 1.4 to 1.8 times that of the Ln source compound used. For example, to produce a $(Y,Gd)BO_3$:Eu phosphor, the amount of the boron (B) source compound may be 1 to 3 times (based on a molar ratio), for example 1.2 to 2 times or 1.4 to 1.8 times that of the total amount of a yttrium (Y) source compound, a gadolinium (Gd) source compound, and an europium (Eu) source compound.

According to an exemplary embodiment, the Ln source compound may be a compound represented by $ML_3$ where M includes at least one selected from the group consisting of La, Ce, Eu, Gd, Tb, Er, Yb and any mixtures thereof, and L includes at least one selected from the group consisting of Cl, Br, $NO_3$, $OCH_3$, $OC_2H_5$, $OC_3H_7$, $OC_4H_9$ and any mixtures thereof; the yttrium (Y) source compound may include at least one compound selected from the group consisting of yttrium(III) chloride, yttrium(III) sulfate, yttrium(III) acetate, yttrium(III) carbonate, and any mixtures thereof; the boron (B) source compound may include at least one compound selected from the group consisting of $H_3BO_3$, boron hydride, an organic boron compound, and any mixtures thereof; the phosphorous (P) source compound may include at least one compound selected from the group consisting of $H_3PO_4$, $NH_4H_2PO_4$, $(NH_4)_2HPO_4$, and any mixtures thereof; and the vanadium (V) source compound may include at least one compound selected from the group consisting of $NaVO_3$, $NH_4VO_3$ and any mixtures thereof.

Also, the phosphor starting material may include an activator source compound conventionally used in the related arts. The activator source compound may be any compound including at last one element selected from a group consisting of La, Ce, Eu, Tb, Er, and Yb, such as $Eu(NO_3)_3$. $Eu(CH_3COO)_3$. The amount of the activator source compound may be 1~10 mol % based on the amount of other rare earth element source compounds that do not belong to the activator source compound.

Meanwhile, the solvent may include at least one selected from the group consisting of water; aliphatic monool such as methanol, ethanol, or isopropanol; aliphatic diol such as ethylene glycol, diethylene glycol, or propylene glycol; aliphatic triol such as glycerine; and any mixtures thereof. When a high boiling point solvent is used, a phosphor precursor may be formed in a particle form in the subsequent process, and when a low boiling point solvent is used, a phosphor precursor may be formed in a gel state. Usually, aliphatic mono-ols and water may be regarded as a low boiling point solvent, while aliphatic diol-ols and aliphatic tri-ols may be regarded as a low boiling point solvent. The amount of solvent used may be in the range of 5~20 times (in volume) that of a phosphor starting material used.

A precipitating agent is added to a mixed solution including the phosphor source material and the solvent to obtain a phosphor precursor. The precipitating agent may not be limited and may be a basic compound, for example, an organic basic compound such as urea, an aqueous ammonia solution, or an aqueous hydrazine ($NH_2NH_2$) solution. The organic basic compound allows fine crystallization nuclei to be uniformly formed when the phosphor precursor precipitates.

The precipitating agent may be excessively used. For example, when urea is used as a precipitating agent to produce the Ln-based phosphor, the amount of urea may be 1 to 10 times (based on a molar ratio), for example 3 to 6 times that of the Ln source compound used.

Also, according to an exemplary embodiment, the precipitation may be performed while heating. The heating may not be limited and may be a solvothermal heating technique or a heating technique using a microwave. The solvothermal heating technique uses specifically designed equipment that endures a high temperature and high pressure condition. Unlike the solvothermal heating technique which requires 10~20 hours of heating, the heating technique using a microwave can be performed at an atmospheric pressure condition and only requires 10~20 minutes, which is suitable for mass-production. In addition, when the heating technique using a microwave is used, crystallization nuclei may be uniformly formed during precipitation. The heating temperature may not be limited and may be almost 40° C. to a boiling point of the solvent used.

According to an exemplary embodiment, the solvent may further include a surface-active agent. When the surface-active agent is used, the dispersion of the phosphor precursor can be improved and the agglomeration of the phosphor precursor can be prevented and thus, the shape and size of the final phosphor particle can be controlled. Herein, the expression "shape control" means that the shape of the phosphor particle is controlled to have a uniform spherical shape or to be similar to a spherical shape. The expression "size control" means that the size of the phosphor particle is controlled to have a submicron size. The surface-active agent may not be limited and may include, for example, at least one material selected from the group consisting of citric acid, acetic acid, sodium acetate, ammonium acetate, oleic acid, sodium oleate, ammonium oleate, ammonium succinate, polyacrylate, glycine and acyl glutamate. The amount of the surface-active agent used may be 0.01 wt. % to 5 wt. % based on the total amount of the Ln source compound used.

According to an exemplary embodiment, the obtained phosphor precursor is washed, dried, and collected.

According to an exemplary embodiment, the obtained phosphor precursor is treated with an inorganic salt. The treating with the inorganic salt may be conducted in such a manner that the phosphor precursor and the inorganic salt are brought into contact each other, for example allowing the inorganic salt to infiltrate into a space between neighboring phosphor precursors and filling the space with the inorganic salt. The treating with the inorganic salt may be performed by mixing the phosphor precursor and the inorganic salt. The mixing may be homogenous mixing by stirring. The mixing may be conducted 5~30 minutes at ambient conditions with about 10-30° C. and 1 atm. Stirring may be conducted by using a magnetic stirrer, a mechanical stirrer, or a sonicator.

When a phosphor precursor is produced according to an exemplary embodiment and then treated with the inorganic salt, as illustrated in FIG. 1, the inorganic salt may function as a boundary between neighboring phosphor precursors. When the phosphor precursor is heat-treated to form a nanophosphor, the inorganic salt functions as a barrier wall between neighboring phosphor precursor or phosphor particles and the agglomeration of phosphors formed may be prevented.

The inorganic salt may not be limited and may include, for example, at least one material selected from the group consisting of $NaBO_2$, $LiBO_2$, $KBO_2$, $MgSO_4$, $Li_2SO_4$, $Na_2SO_4$, $K_2SO_4$, $MgCl_2$, $CaCl_2$, $SrCl_2$, $BaCl_2$, $Li_2CO_3$, $Na_2CO_3$, $K_2CO_3$, $Rb_2CO_3$, LiCl, NaCl, KCl, RbCl, CsCl, and any mixtures thereof.

Also, the inorganic salt may be stable in a heat treatment condition in the subsequent process and may be easily removed with water, alcohol etc.

Also, according to an exemplary embodiment, the inorganic salt may be used in the form of an aqueous solution, for example a saturated aqueous solution.

Then, the phosphor precursor treated with the inorganic salt is heat-treated to form nanophosphor particles. Herein, the 'nano' refers to a particle size of a submicron level, that is, an average size of hundreds nanometers, for example a few to hundreds nanometers.

During the heat-treatment process, phosphor precursor particles are crystallized and phosphors are formed. In this case, the inorganic salt functions as a segregating agent between neighboring phosphor precursor or phosphor particles and agglomeration of formed phosphors may be prevented.

The heat treatment condition may not be limited so long as it can convert the phosphor precursor into phosphor particles, and may be a conventional heat treatment condition. The heat treatment process may be performed at high temperature of 800° C. to 1500° C., for example 900° C. to 1400° C. When the heat treatment process is performed at a temperature less than 800° C., the crystallinity of the obtained phosphor particles may be low and the luminescence efficiency of the phosphor may be lowered. On the other hand, when the heat treatment process is performed at a temperature higher than 1500° C., the crystallinity of the obtained phosphor particles may be high. However, in this case, phosphor particles may agglomerate and the particle size may be increased and thus, it is difficult to produce phosphor particles having a nano size.

During the heat treatment, the ambient atmosphere may not be limited, and may be an ambient air.

Also, after the heat treatment, the residual inorganic solvent between nanophosphor particles may be removed by washing with a cleaning solution. The cleaning solution may be any solution that dissolves and removes the inorganic salt. For example, the cleaning solution may be water; aliphatic monool such as methanol or ethanol; or aliphatic diol such as ethylene glycol.

Another aspect is directed to nanophosphor particles produced using the method described above. For the nanophosphor particles, shapes and sizes are controlled by agglomeration-control of the inorganic salt and thus, the size distribution may be uniform and the nanophosphor particles are almost spherical.

Figure 2:
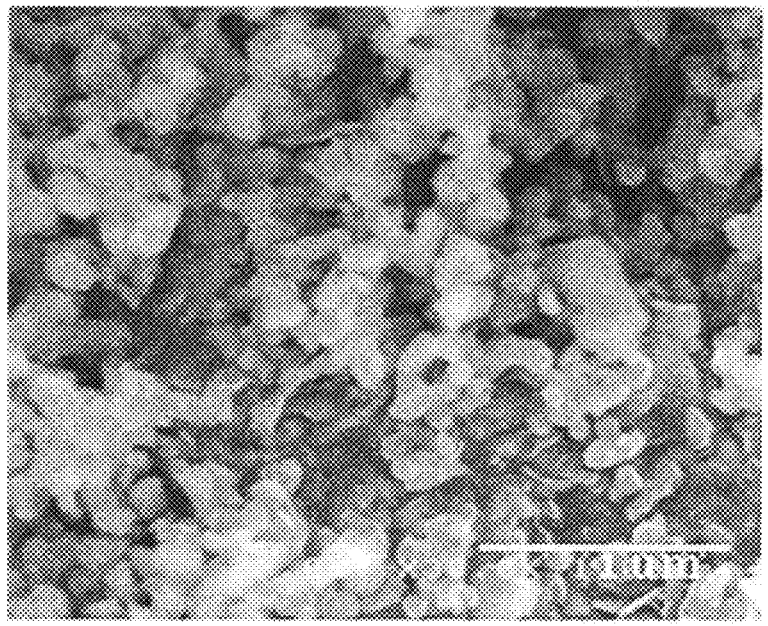
FIG. 2 is a scanning electron microscopic (SEM) image of nanophosphor particles synthesized according to an exemplary embodiment.
Figure 3:
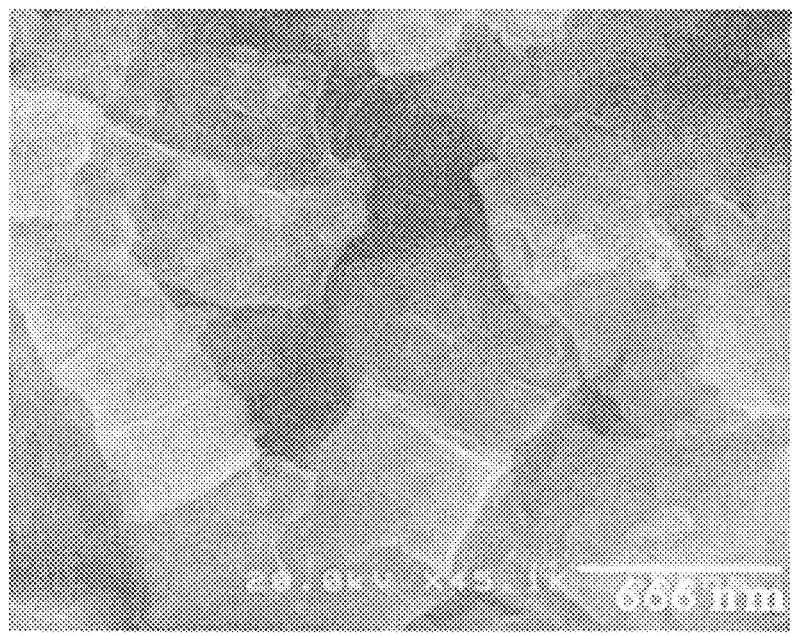
FIG. 3 is a SEM image of nanophosphor particles synthesized without being treated with an inorganic salt.
Figure 4:
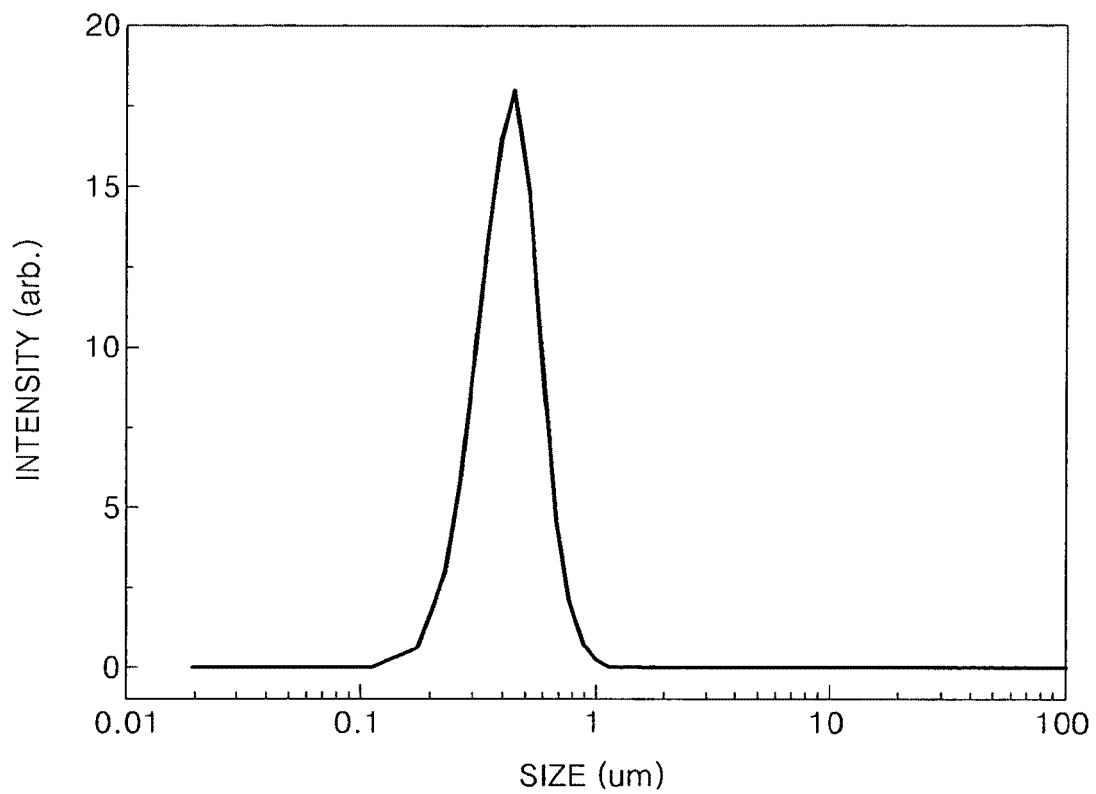
FIG. 4 is a graph illustrating a size distribution of nanophosphor particles synthesized according to an exemplary embodiment, which is measured using a laser scattering technique.

For example, referring to FIGS. 2-4, when nanophosphor is produced without being treated with an inorganic salt, phosphor particles agglomerate and form a cluster (see FIG. 3). However, when nanophosphor is produced with being treated with the inorganic salt, the particle size may be controlled and particle agglomeration may be prevented, the particle sizes are relatively uniform, and the formed nonophosphors are spherical or almost spherical (see FIGS. 2 and 4).

The nanophosphor may be applied in a flat panel display, for example a plasma display panel (PDP).

It is known that performance of the flat panel display depends on the shape of phosphor particles. Also, vacuum ultraviolet rays are absorbed by a very thin portion (100 to 200 nm) of the surface of a phosphor particle. Thus, for a PDP using vacuum ultraviolet rays as an excitation source, properties of the phosphor surface significantly affect luminescence efficiency. Conventional phosphor produced by a solid state reaction including a milling or grinding process has a non-uniform shape and many surface defects and thus, is not suitable to produce a PDP having high efficiency and high resolution.

According to the method of producing nanophosphor described above, the particle size and shape can be controlled during the synthesis process and thus, the milling process or the grinding process is not required and formation of surface defects can be suppressed. Accordingly, the nanophosphor is suitable to produce a PDP having high efficiency and high resolution. In addition, since the nanophosphor is almost spherical and has a uniform size distribution, high packing density in a display device can be achieved, and scattering of generated visible rays can be reduced and thus screen brightness can be increased and high resolution can be achieved.

Another aspect is directed to $YBO_3$-based nanophosphor particles. In an exemplary embodiment, in a photoluminescence emission spectrum of the $YBO_3$-based nanophosphor which is obtained using a monochromatic light having a wavelength of 254 nm as an excitation source, the intensity of the emission component at a wavelength range of about 580 to 600 nm, for example about 594 nm may be equal to or smaller than the intensity of the emission component at a wavelength range of about 600 to 620 nm, for example about 613 nm. For example, in a photoluminescence emission spectrum obtained using a monochromatic light having a wavelength of 254 nm as an excitation source, the intensity of the emission component at a wavelength of about 594 nm: the intensity of the emission component at a wavelength of about 613 nm may be 1:1 to 1:4, for example, 1:1.5 to 1:3. Emission at a wavelength of about 594 nm corresponds to orange light and emission at a wavelength of about 613 nm corresponds to red light. For the $YBO_3$-based nanophosphor, the intensity of orange emission is smaller than the intensity of red emission and thus, chromaticity that is color purity in the red region is significantly improved and the color of deep-red can be obtained.

The nanophosphor may be represented by $YBO_3:M$ where M includes at least one selected from the group consisting of $Eu^{3+}$, $Tb^{3+}$, $Ce^{3+}$ and any mixtures thereof.

The $YBO_3$-based nanophosphor may be produced using a method of producing nanophosphor according to the embodiments described above.

The exemplary embodiments will be described in further detail with reference to the following examples. These examples are for illustrative purposes only and are not intended to limit the scope.

EXAMPLE 1

Production of $YBO_3$:Eu Nanophosphor Particles Using an Inorganic Salt 3.830 g of $Y(NO_3)_3 \cdot 6H_2O$, 0.428 g of $Eu(NO_3)_3 \cdot 5H_2O$, 1.210 g of $H_3BO_3$, and 6.0 g of urea are dissolved in 200 ml of a diethylene glychol solution and the resultant solution is stirred to obtain a solution. Then, 800 W of a microwave is irradiated to the solution at an atmospheric pressure for 10-15 minutes while heating at about 200° C., thereby producing a phosphor precursor. The phosphor precursor is filtered and washed with water and dried.

The phosphor precursor is immersed in excess $MgSO_4$ saturated aqueous solution and then the resultant solution is stirred for about 30 minutes. The mixed solution is dried to evaporate water and then heat-treated in the air at 900° C. for about 0.5 to 1 hour. Then, the heat treatment product is washed to remove $MgSO_4$ to obtain $YBO_3$:Eu particles.

FIG. 2 is a scanning electron microscopic (SEM) image of $YBO_3$:Eu nanophosphor particles synthesized according to the present example. As illustrated in FIG. 2, the phosphor particles does not agglomerate, has a relatively uniform nano particle size, and is spherical.

EXAMPLE 2

Production of $YBO_3$:Eu Nanophosphor Particles Using an Inorganic Salt and a Surface-Active Agent $YBO_3$:Eu nanophosphor particles are produced in the same manner as in Example 1, except that during the synthesizing of phosphor precursor, 0.19 g of a citric acid surface-active agent (Sigma-Aldrich) is further added to the diethylene glycol solvent.

Figure 6:
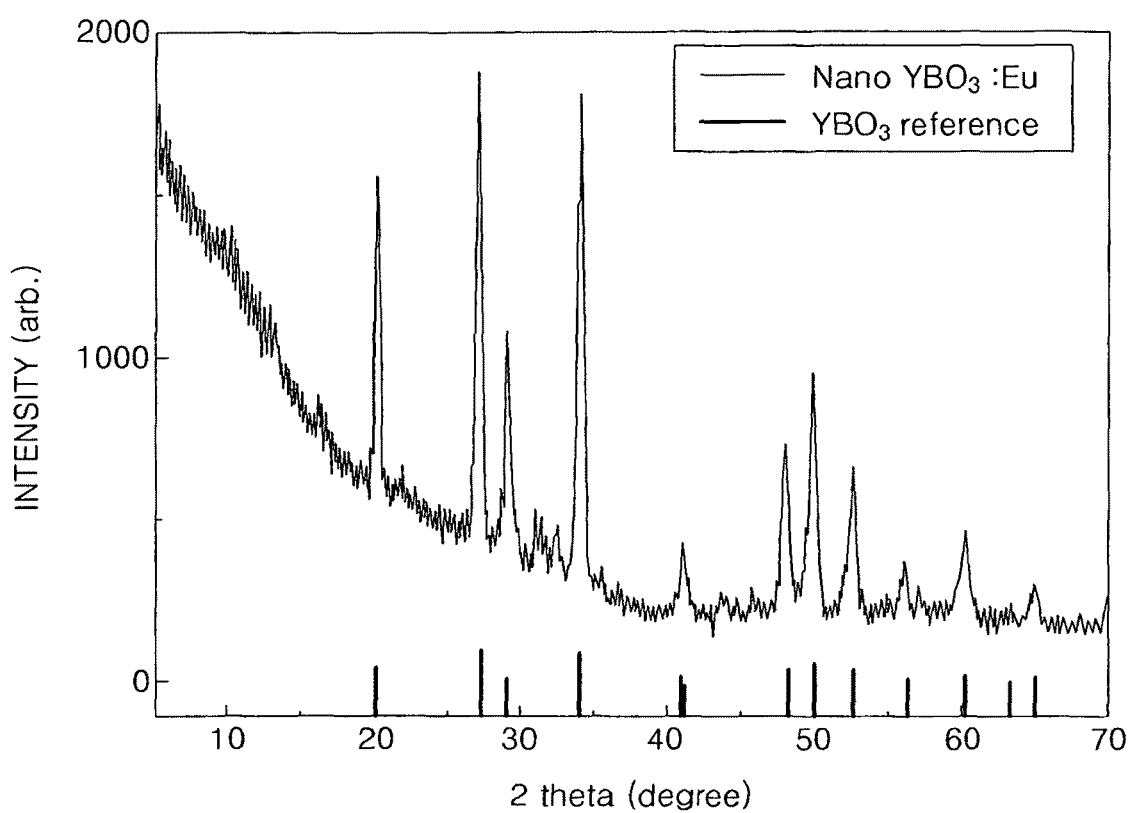
FIG. 6 is a graph showing X-ray diffraction spectroscopy analysis results of nanophosphor particles synthesized according to an exemplary embodiment.

FIG. 4 is a graph illustrating a size distribution of $YBO_3$:Eu nanophosphor particles synthesized according to the present example, which is measured using a laser scattering technique. Referring to FIG. 4, all $YBO_3$:Eu phosphor particles have a size of less than 1 μm, and a central size of about 300 nm. FIG. 6 is a graph showing X-ray diffraction spectroscopy analysis results of the obtained $YBO_3$:Eu phosphor particles. Referring to FIG. 6, it is seen that the obtained $YBO_3$:Eu phosphor particles have a typical diffraction pattern of a $YBO_3$-based crystal.

COMPARATIVE EXAMPLE 1

Production of $YBO_3$:Eu Particle Nanophosphor without Treatment with an Inorganic Salt $YBO_3$:Eu phosphor particles are produced in the same manner as in Example 1, except that, when during the synthesizing of $YBO_3$:Eu phosphor particles, the immersing of the phosphor precursor in the saturated aqueous solution of $MgSO_4$ and stirring the resultant solution are not performed.

FIG. 3 is a SEM image of the $YBO_3$:Eu phosphor particle synthesized in Comparative Example 1.

As illustrated in FIG. 3, it is seen that the $YBO_3$:Eu phosphor particles produced without being treated with an inorganic salt are agglomerated to each other and formed a cluster.

Figure 5:
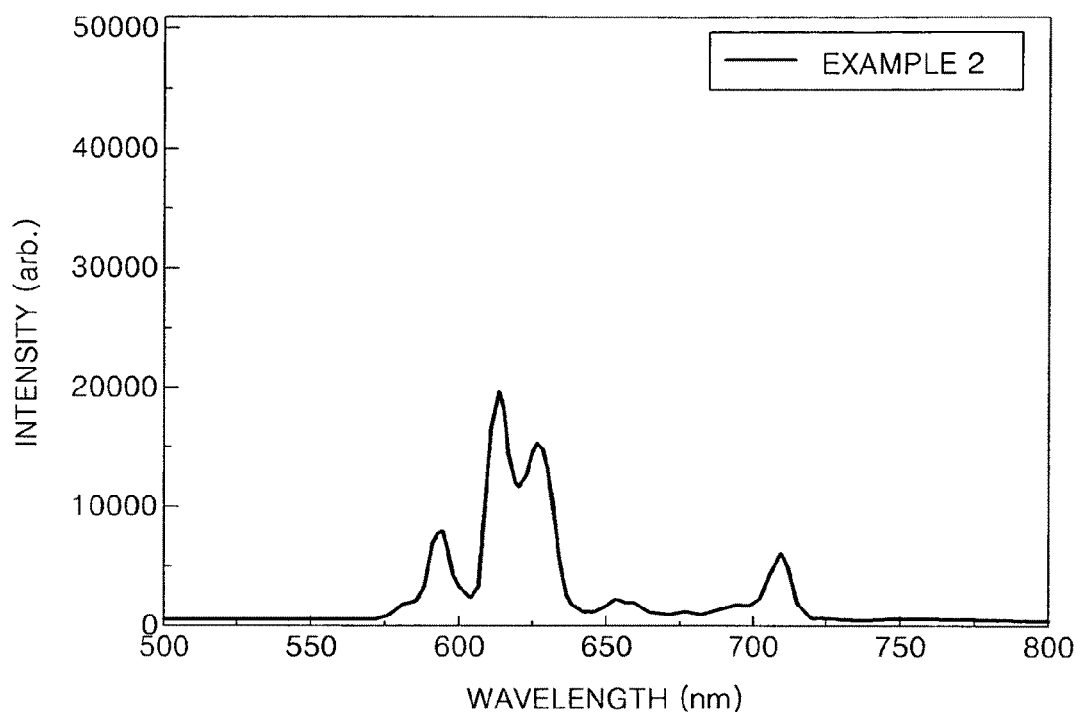
FIG. 5 illustrates a photoluminescence emission spectrum of nanophosphor particles synthesized according to an exemplary embodiment.

FIG. 5 illustrates a photoluminescence emission spectrum of $YBO_3$:Eu nanophosphor particles prepared according to Example 2, which is obtained by irradiating a monochromatic light having a wavelength of 254 nm as an excitation source to the $YBO_3$:Eu phosphor particles. Referring to FIG. 5, it can be seen that the $YBO_3$:Eu nanophosphor particles prepared according to Example 2 have excellent luminescence efficiency.

Also, in the photoluminescence emission spectrum of the $YBO_3$:Eu nanophosphor particles prepared according to Example 2, the intensity of orange emission component at a wavelength of about 594 nm due to $Eu^{3+}$ is smaller than the intensity of red emission component at a wavelength of about 613 nm. Accordingly, for the $YBO_3$:Eu nanophosphor particles, chromaticity (color purity) of the red region is significantly improved and thus, a deep-red emission characteristic can be obtained.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A method of producing nanophosphor, consisting essentially of:
    dissolving a phosphor starting material in a solvent, wherein the solvent optionally includes a surface-active agent, and adding a precipitating agent thereto, thereby producing a phosphor precursor;
    wherein the phosphor starting material consists essentially of a compound represented by ML3 where M is at least one selected from the group consisting of Y, La, Eu, Gd, Tb, Er, Yb and any mixtures thereof and L comprises Cl, Br NO3, OCH3, OC2H5, OC3H7, or OC4H9 or any mixtures thereof; and at least one selected from the group consisting of H3BO3, boron hydride, an organic boron compound, H3PO4, NH4H2PO4, (NH4)2HPO4, NaVO3, NH4VO3 and any mixtures thereof;
    treating the phosphor precursor with an inorganic salt;
    heat-treating the phosphor precursor treated with the inorganic salt to produce nanophosphor particles; and
    removing the inorganic salt by washing.

2. The method of claim 1, wherein the solvent comprises at least one selected from the group consisting of water, aliphatic monool, aliphatic diol, aliphatic triol, and any mixtures thereof.

3. The method of claim 1, wherein the step of adding the precipitating agent is performed while heating.

4. The method of claim 1, wherein the heating is performed with a microwave oven.

5. The method of claim 1, wherein the precipitating agent is a basic compound.

6. The method of claim 1, wherein the solvent includes a surface-active agent and the surface-active agent comprises at least one material selected from the group consisting of citric acid, acetic acid, sodium acetate, ammonium acetate, oleic acid, sodium oleate, ammonium oleate, ammonium succinate, polyacrylate, glycine, acyl glutamate, and mixtures thereof.

7. The method of claim 1, wherein, in the treating the phosphor precursor with the inorganic salt, a space between neighboring phosphor precursor particles is filled with the inorganic salt.

8. The method of claim 1, wherein the inorganic salt is in a saturated aqueous solution.

9. The method of claim 1, wherein the inorganic salt comprises at least one material selected from the group consisting of NaBO2, LiBO2, KBO2, MgSO4, Li2SO4, Na2SO4, K2SO4, MgCl2, CaCl2, SrCl2, BaCl2, LizCO3, NazCO3, K2CO3, RbzCO3, LiCl, NaCl, KC1, RbC1, CsCl, and any mixtures thereof.

10. A method of producing a YBO3-based nanophosphor consisting essentially of:
dissolving a phosphor starting material consisting essentially of an yttrium(Y) source compound and a boron(B) source compound in a solvent, wherein the solvent optionally includes a surface-active agent, and adding a precipitating agent thereto, thereby producing a phosphor precursor;
wherein the yttrium(Y) source compound is represented by YL3; and L is at least one selected from the group consisting of Cl, Br, NO3, OCH3, OC2H5, OC3H7, OC4H9 and any mixtures thereof;
treating the phosphor precursor with an inorganic salt;
heat-treating the phosphor precursor treated with the inorganic salt to produce YBO3- based nanophosphor particles; and
removing the inorganic salt by washing.

11. The method of claim 10, wherein the boron(B) source compound comprises at least one material selected from the group consisting of H3BO3, boron hydride, an organic boron compound and any mixtures thereof.

12. The method of claim 10, wherein the step of adding the precipitating agent is performed while heating.

13. The method of claim 12, wherein the heating is performed using a heating technique within a microwave oven.

14. The method of claim 10, wherein, in the treating the phosphor precursor with the inorganic salt, a space between neighboring phosphor precursor particles is filled with the inorganic salt.

15. The method of claim 10, wherein the inorganic salt is in the form of a saturated aqueous solution.

16. The method of claim 10, wherein the inorganic salt comprises at least one material selected from the group consisting of NaBO2, LiBO2, KBO2, MgSO4, Li2SO4, Na2SO4, K2SO4, MgCl2, CaCl2, SrCl2, BaCl2, Li2CO3, Na2CO3, K2CO3, Rb2CO3, LiCl, NaCl, KCl, RbCl, CsCl and any mixtures thereof.

* * * * *